United States Patent

[11] 3,575,096

[72] Inventor Paul Justin Ernisse
 Rochester, N.Y.
[21] Appl. No. 790,359
[22] Filed Jan. 10, 1969
[45] Patented Apr. 13, 1971
[73] Assignee Eastman Kodak Company
 Rochester, N.Y.

[54] LOW LIGHT INDICATOR FOR CAMERAS
 7 Claims, 5 Drawing Figs.
[52] U.S. Cl. .................................................... 95/10,
 95/11
[51] Int. Cl. ..................................................... G03b 17/18,
 G01j 1/44
[50] Field of Search .......................................... 95/10 (C),
 11

[56] References Cited
 UNITED STATES PATENTS
3,282,189 11/1966 McFarlane .................... 95/10(C)X 3,374,718 3/1968 Hochreiter ..................... 95/10
3,455,218 7/1969 Eagle et al. .................... 95/10
3,500,731 3/1970 Bresson et al. ................ 95/64
3,511,574 5/1970 Burgarella ..................... 95/10

Primary Examiner—Samuel S. Matthews
Assistant Examiner—Joseph F. Peters, Jr.
Attorneys—R. W. Hampton and Daniel E. Sragow ABSTRACT: In a camera provided with a low light indicator system in which a sensitive relay armature is attractable by an electromagnet energized in proportion to scene brightness and thereby is caused to assume either of two positions depending on whether scene illumination is above or below a predetermined value, the armature is adapted when in one of its two positions to prevent opening of a switch which normally opens in response to movement of a camera operating member to thus energize an indicator lamp or the like when scene brightness is below such predetermined value.

Patented April 13, 1971
3,575,096
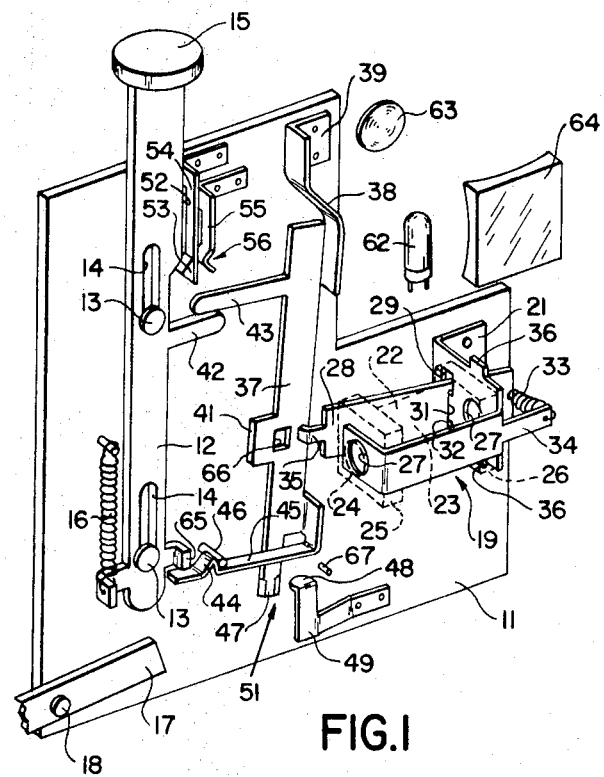
FIG.1
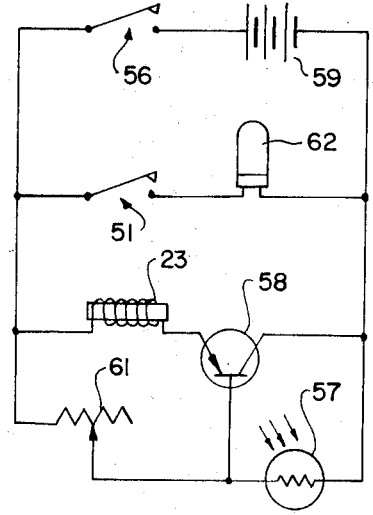
FIG.3
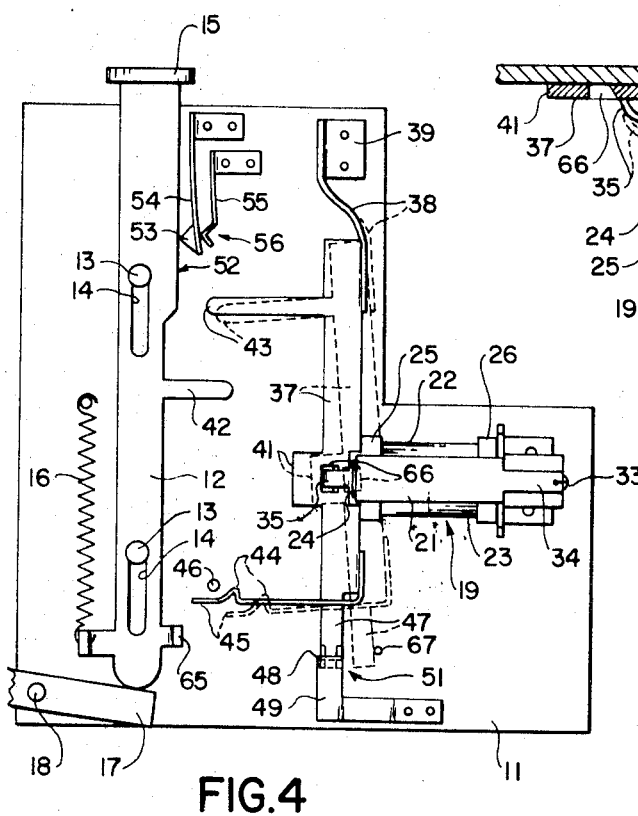
FIG.4
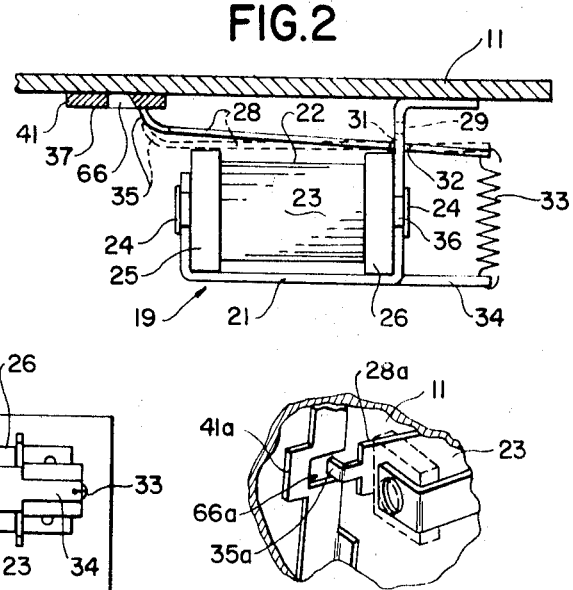
FIG.2
FIG.5
PAUL J. ERNISSE
INVENTOR.
BY Daniel E. Gragow
Robert W. Hampton
ATTORNEYS 3,575,096

LOW LIGHT INDICATOR FOR CAMERAS

REFERENCE TO RELATED APPLICATION

Reference is hereby made to commonly assigned U.S. Pat. application Ser. No. 623,088 entitled Automatic Exposure Control Means for Cameras, filed in the name of Paul Justin Ernisse on Mar. 14, 1967.

BACKGROUND OF THE INVENTION

1. Field of the Invention

The present invention relates to low light indicator systems for cameras and more particularly to improvements in low light indicator systems of the type disclosed in commonly assigned copending U.S. Pat. application Ser. No. 623,088 entitled Automatic Exposure Control Means for Cameras, filed in the name of Paul Justin Ernisse on Mar. 14, 1967. As disclosed in said copending application, said system may incorporate a sensitive spring loaded relay armature arranged to be attracted to an electromagnet by a magnetic force functionally related to scene brightness so that the armature assumes either of two positions depending on whether such brightness is above or below a predetermined value.

2. Description of the Prior Art

In accordance with the invention disclosed in the above-identified U.S. Pat. application Ser. No. 623,088, a camera is provided with a photocell adapted to generate or modulate an electric current to provide an output current proportional to the illumination intensity of a viewed scene. This output current energizes an electromagnet which thereby exerts on a movable armature an attractive force likewise proportional to scene brightness. The armature is resiliently biased to a position at a slight distance from the electromagnet by a very light spring, so that it will be attracted magnetically into contact with the electromagnet only if the scene illumination intensity exceeds a predetermined "low light" value below which the camera cannot produce a satisfactory exposure. An electric switch comprising a stationary contact member and the movable armature is closed except when the armature is attracted to the electromagnet. This switch, in turn, is connected in series with a battery, an indicator lamp and with another switch closed by the initial manual movement of the shutter operating member. Accordingly, as the operator begins to move the shutter operating member, the illumination produced by the signal lamp is visible in the viewfinder if a low light condition prevails, thereby alerting the operator to discontinue further movement of the shutter operating member. Additionally, the same electromagnet may be arranged to similarly influence other progressively less sensitive armatures which are adapted to adjust the lens opening or shutter speed in accordance with scene illumination intensities brighter than the predetermined low light intensity value.

Since it would be impractical to operate such an electromagnetic relay device by utilizing only the output current of a photovoltaic photocell, a photoresistive photocell is employed in conjunction with a small battery and a signal amplifier unit adapted to amplify the output current of the photocell. Nevertheless, to minimize current consumption and to conserve space the electromagnetic relay device must be quite small and sensitive; i.e., the armature must move through only a relatively small distance and must be biased away from the electromagnet by only a very weak spring member. Consequently, the use of the armature, per se, as the movable contact of a lamp switch, may fail to provide positive switch operation due to the small separation gap between the switch contact surfaces and the very limited pressure with which those two surfaces are brought together. For example, a small particle of dust or other foreign substance may effectively insulate the contact surfaces from one another due to the absence of sufficient contact pressure to crush or dislodge even such a minute impediment lodged between the contact surfaces.

SUMMARY OF THE INVENTION

To eliminate the above-described possibility of switch malfunctioning, the present invention provides a low light indicator system with a signal light control switch comprising a movable switch contact member adapted to move with considerable force along a relatively long movement path into engagement with a stationary switch contact. Rather than serving directly as a switch element, the switch relay armature moves into and out of the path of movement of the movable switch member, depending on scene brightness, and mechanically blocks movement of that switch member so that it closes the lamp circuit to provide a visible signal if a low light condition prevails. The energization of the electromagnet and the movement of the movable switch member occur in response to the initial manual movement of the shutter operating member, as previously described, but the motive power imparted to the movable switch member is derived from the manual operation of the shutter operating member and therefore is not limited by electrical considerations. Consequently, the switch contact surfaces can be brought into engagement with sufficient force to insure positive electrical contact, preferably by a wiping action adapted to burnish the two contacting surfaces.

Various means for practicing the invention and other advantages and features thereof will be apparent from the following detailed description of illustrative preferred embodiments of the invention, reference being made to the accompanying drawings in which like reference numerals refer to like elements.

BRIEF DESCRIPTION OF THE DRAWINGS

In the accompanying drawing:

FIG. 1 is a perspective view of a low light indicator system according to a first embodiment of the invention, showing the respective positions of the depicted components before the shutter operating member is manually operated;

FIG. 2 is an enlarged plan view of the electromagnetic relay unit incorporated in the system shown in FIG. 1;

FIG. 3 is a diagram of the electrical circuit of the subject low light indicator system;

FIG. 4 is an elevational view corresponding to FIG. 1 illustrating the two alternate positions of the movable switch member when the shutter operating member is fully depressed; and FIG. 5 shows an enlarged plan view of an alternative embodiment similar to that shown in FIG. 2.

DESCRIPTION OF THE ILLUSTRATIVE PREFERRED EMBODIMENTS

In FIGS. 1 and 4 of the accompanying drawing, a first illustrative embodiment of the invention is shown to comprise a vertical insulating support plate 11 which is mounted within a camera housing, not shown. Shutter operating slide 12 is mounted to support plate 11 by rivets 13 extending through elongate slots 14. At its upper end, slide 12 is provided with an externally accessible pushbutton 15 by which the slide can be depressed manually against the influence of spring 16 to its lowermost position shown in FIG. 4. A shutter operating lever 17 is pivoted to the support plate by stud 18 and is adapted to operate the camera shutter, not shown, when it is engaged and rocked to the position shown in FIG. 4 during the final portion of the downward movement of slide 11.

The electromagnetic relay device 19 comprises a mounting bracket 21 rigidly attached to support plate 11. An electromagnet 22, shown in phantom view in FIG. 1 for purposes of clarity, comprises a coil 23 wound on a cylindrical core 24 between rectangular pole pieces 25 and 26. The opposite ends of core 24 protrude beyond the end faces of the pole pieces and are received in corresponding circular openings 27 in bracket 21, whereby the electromagnet is supported rigidly in parallel spaced relation to support plate 11. As best depicted in FIGS. 1 and 2, the low light relay armature 28 is an elongated piece of ferromagnetic material which extends through an opening 29 in the bracket. A bracket tooth 31, extending into opening 29, is received in a corresponding transverse slot 32 in the armature, thereby positioning the latter longitudinally while allowing it to rock about the fulcrum defined by the corner of the pole piece 26. The end of the armature beyond bracket 21 is connected by means of a light tension spring 33 to a stationary support arm 34, whereby the curved tooth 35 at the opposite end of the armature is lightly biased toward the support plate. As previously mentioned, additional progressively less sensitive armatures can be supported above and below the electromagnet, for example by means of bracket teeth 36, for the purpose of adjusting the lens opening or shutter speed as a function of scene illumination above the low light level at which armature 28 is actuated.

Between the shutter operating slide and the relay unit, switch operating lever 37 is located with its rearward face in contact with the forward surface of the support plate 11. At its upper end, lever 37 includes a flexible resilient spring strap 38 attached to the support plate by mounting ear 39. This spring strap allows the switch operating lever to move arcuately between the two positions shown respectively in solid lines in FIG. 1 and in broken lines in FIG. 4, while resiliently urging it toward the latter position. Regardless of the position of the switch lever, however, its central portion comprising ear 41 is located between the support plate and the rearwardly curved tooth 35 of armature 28.

When the shutter operating slide is in its raised position, shown in FIG. 1, lateral arm 42 thereof is immediately below reset arm 43 of the switch operating lever, which is held in its depicted position against the influence of spring strap 38 by the engagement of latch tooth 44 of resilient latch strap 45 with a stationary pin 46. As long as the switch operating lever is in this position, its lower contact tongue 47 is spaced laterally from contact ear 48 of switch arm 49, which is resiliently biased toward the support plate. Therefore, the signal energizing switch 51, adapted to electrically connect mounting ear 39 of the switch operating lever with switch arm 49 through the respective contact elements 47 and 48 remains open as long as the switch operating lever is so positioned. The raised position of slide 12 also locates cam edge 52 thereof above insulating follower block 53 attached to flexible conductive strap 54. Accordingly, the resiliency of that strap retains it beyond engagement with a similar second conductive strap 55, whereby the circuit energizing switch 56 defined by straps 54 and 55 is in an open condition. Concurrently, the abutment of the curved tooth 35 of armature 28 against the forward face of the switch operating lever establishes the free end of the armature at a predetermined spaced distance from the adjacent edge of electromagnet pole piece 25.

The electric circuit incorporated in the subject low light illumination system is depicted in FIG. 3 and includes a photoresistive photocell 57, the resistance of which is relatively high in darkness and decreases in proportion to increasing illumination of the cell. As is well known in the camera art, the photocell is mounted behind a transparent window, now shown, so that it is illuminated by light from the scene viewed through the camera viewfinder. Preferably by means of printed wiring on the insulating support plate 11, the cell is connected between the base and the collector of a PNP-type transistor 58, the emitter of which is connected to one side of the electromagnet coil 23. The collector of the transistor is connected to the negative side of an electric battery 59. The positive side of the battery is connected to the other end of coil 23 through switch 56 comprising conductive straps 54 and 55. A variable resistor 61 also is incorporated in the circuit between the base of the transistor and the positive terminal of the battery. By this arrangement, when the cell is in darkness its resistance is relatively high and therefore the base return negative voltage of the transistor is correspondingly low. As the resistance of the cell decreases in response to its exposure to light, however, the base negative return voltage increases correspondingly, whereby a proportional but much greater current flows through the transistor to energize the electromagnet coil as a function of scene illumination. By varying the resistance of variable resistor 61, the effect of the photocell on the base negative return voltage of the transistor can be modulated for purposes of calibrating the circuit.

An indicator lamp 62 is also incorporated in the electric circuit in series with switches 51 and 56. Thus, when the circuit is energized by the closing of switch 56, indicator lamp 62 will be illuminated whenever switch 51 is closed. As shown in FIG. 1, the indicator lamp is positioned so that its illumination is visible in the camera viewfinder, represented by lenses 63 and 64. When the operator begins to depress the shutter operating slide toward the position shown in FIG. 4, its initial downward movement closes switch 56 and energizes the photoresistive circuit, as just described. Consequently, if scene illumination is below a predetermined level established by the adjustment of variable resistor 61, the electromagnet cannot exert sufficient force on the armature to attract it away from the position in which its tooth 35 rests against it away from the the forward surface of switch operating lever 37. After switch 56 has been closed, the continuing downward movement of the shutter operating slide next causes latch release ear 65 thereof to flex the free end of latch strap 45 downwardly so that latch tooth 44 is disengaged from pin 46. As soon as such disengagement occurs, spring strap 38 at the upper end of the switch operating lever causes that lever to move arcuately in a counterclockwise direction, whereby its lower contact tongue 47 makes positive contact with switch contact ear 48 as it slides behind that ear by displacing the corresponding end of switch arm 49 away from the support plate. If a low light condition prevails, the resulting energization of the electromagnet is insufficient to move armature tooth 35 out of resilient contact with the forward face of switch operating lever 37. Therefore, as the movement of lever 37 brings hole 66 therein into alignment with the tooth, the tooth enters the hole under the influence of spring 33 and blocks further arcuate movement of the lever when it reaches the position shown in solid lines in FIG. 4. Accordingly, contact tongue 47 remains in positive contact with switch arm 49, whereby the resulting illumination of indicator lamp 62 will alert the operator to discontinue depressing pushbutton 15 before the shutter is operated. If, however, the scene illumination is sufficiently bright to cause armature 28 to be attracted to pole piece 25 in opposition to spring 33, the armature tooth has no influence on the movement of lever 37. Hence, the switch operating lever then moves to the position shown in broken lines in FIG. 4 in which it abuts against stop pin 67, thereby positioning contact tongue 47 beyond engagement with switch arm 49. In so moving between its two extreme positions, tongue 47 makes momentary contact with contact ear 48 of switch arm 49, but the duration of such contact is insufficient to cause the signal lamp to produce illumination noticeable in the viewfinder. Consequently, the operator continues to depress the shutter operating slide to its lowermost position, shown in FIG. 4, to actuate the camera shutter.

FIG. 5 shows an alternate embodiment wherein relay armature 28a has an extended curved tooth 35a which rests upon support plate 11 when the electromagnet 23 is insufficiently energized. Ear 41a is shaped so that tooth 35a can move in slot 66a in order that armature 28a does not rest upon a movable member, which might decrease its accuracy.

When the operator releases the pushbutton, either after having observed the low light signal or after having completed an exposure, the shutter operating slide is returned to its raised position shown in FIG. 1 by spring 16. As this occurs, latch release ear 65 moves above the free end of latch strap 45 so that it does not interfere with the reengagement of latch tooth 44 with pin 46. Thereafter, lateral arm 42 of slide 12 engages reset arm 43 of the switch operating lever and rocks that lever back to its initial position shown in FIG. 1 by bending resilient spring strap 38. If armature tooth 35 is located within hole 66 in the switch operating lever, the curved profile of the tooth causes it to be cammed out of that hole by the return movement of lever 37. During the upward movement of slide 12, cam edge 52 thereof moves above follower block 53 of resilient switch strap 54, thus causing switch 56 to open so that battery 59 is isolated from the other elements of the electrical circuit. By the time slide 12 completes its upward movement, therefore, the entire electrical circuit is deenergized and all of the components of the system are returned to their respective initial positions depicted in FIG. 1.

From the foregoing description, it should be apparent that the simple and straightforward structure of the present invention provides very positive switch operation in a low light signal system by allowing the switch contacts to be engaged with considerable force without decreasing the sensitivity or current consumption of the electromagnetic relay unit incorporated in the system. Since the sensitive armature serves to determine the position assumed by the switch lever under t the relatively strong influence of spring strap 38, it should be apparent also that an equivalent lever could mechanically move a signal member into and out of view instead of serving to electrically energize a signal lamp or the equivalent.

The invention has been described in detail with particular reference to an illustrative preferred embodiment thereof, but it will be understood that variations and modifications can be effected within the spirit and scope of the invention.

I claim:

1. For use in a camera, a scene light level indicator comprising:
    a camera operating member movable to a camera operating position;
    electrically operative indicating means for indicating a scene illumination condition;
    switch means movable between open and closed conditions and electrically connected to said indicating means to energize said indicating means in said closed position;
    means for mechanically coupling said switch means to said camera operating member to move said switch means from said closed position to said open position in response to movement of said camera operating member to said camera operating position; and
    means responsive to said scene illumination condition for rendering the last said means ineffective to move said switch means from said closed position to said open position to thereby effect energization of said indicating means during movement of said camera operating member when the scene illumination condition exists.

2. For use in a camera, a low light indicator comprising:
    a. photoelectric means for detecting scene illumination intensity and for producing an electrical output functionally related to said scene illumination intensity;
    b. a relay unit including
        1. an electromagnet for energization by said output to produce a magnetic attractive influence functionally related to scene illumination;
        2. a magnetically attractable armature movably supported adjacent said electromagnet; and
        3. resilient means for biasing said armature away from said electromagnet to a first position in predetermined spaced relation thereto, whereby said armature is moved by said electromagnet to a second predetermined position only when said electromagnet is energized above a predetermined energization level and thereby overpowers said resilient means;
    c. a movable signal operating member movable along a predetermined movement path between an initial location and a final location;
    d. a shutter operating member movable between an operative position and an inoperative position;
    e. motion producing means responsive to movement of said signal operating member from said inoperative position toward said operative position to move said signal operating member along said path from said initial location toward said final location;
    f. a blocking member carried by said armature and adapted to block movement of said signal operating member at an intermediate location along said movement path unless said armature is in a predetermined one of said first and second positions thereof during movement of said signal operating member; and
    g. signal means for producing a visible signal in response to the presence of said signal operating member at a predetermined one of said intermediate and final locations.

3. A low light indicator according to claim 2 in which the energization of said electromagnet is proportional to the intensity of scene illumination detected by said photocell and in which said blocking member carried by said armature is adapted to block movement of said signal operating member at said intermediate location whenever said electromagnet is energized below said predetermined energization level, said signal means being adapted to produce said visible signal in response to the presence of said signal operating member at said intermediate location.

4. A low light indicator according to claim 3 including:
    a. a first switch member carried by said signal operating member;
    b. a second switch member adapted to be engaged by said first switch member only when said switch operating member is at said intermediate position thereof;
    c. an indicator lamp;
    d. a battery; and
    e. circuit means for electrically connecting said battery and said lamp through the switch defined by said first and said second switch members.

5. A low light indicator according to claim 2 including reset means for returning said signal operating member to said initial location thereof in response to movement of said shutter operating member to said inoperative position thereof.

6. A low light indicator according to claim 2 including a normally opened switch comprising a movable contact carried by said signal operating member and a stationary contact adapted to be engaged by said movable contact when said signal operating member is in a predetermined one of said intermediate and final locations thereof, said signal means comprising an electric lamp connected to a source of electric current through said switch.

7. A low light indicator according to claim 2 including:
    a. a battery;
    b. a first normally opened electric switch adapted when closed to supply current to said photoresistive means from said battery to produce said electric output functionally related to said scene illumination intensity;
    c. means for closing said first electric switch in response to movement of said signal operating member from said operative position toward said inoperative position before such movement has effected the release of said latch means;
    d. a signal lamp; and
    e. a second normally opened electric switch adapted when closed to energize said signal lamp from said battery said second switch comprising a movable contact carried by said signal operating member and a stationary contact adapted to be engaged by said movable contact when said signal operating member is present at a predetermined one of said intermediate and final locations along the movement path thereof.